United States Patent [19]

Moore

[11] Patent Number: 4,531,052
[45] Date of Patent: Jul. 23, 1985

[54] MICROCOMPUTER-CONTROLLED OPTICAL APPARATUS FOR SURVEYING, RANGEFINDING AND TRAJECTORY-COMPENSATING FUNCTIONS

[76] Inventor: Sidney D. Moore, 2045 Idylwild Dr., Prescott, Ariz. 86301

[21] Appl. No.: 422,823

[22] Filed: Sep. 24, 1982

[51] Int. Cl.³ .................. G06F 15/58; F41G 3/06; F41G 413/32
[52] U.S. Cl. .................. 235/404; 89/41.03; 235/407; 364/561
[58] Field of Search ............ 364/516, 174, 176, 423, 364/561; 356/138, 142, 145, 3, 6, 21; 33/233, 237, 238, 246, 297, 298; 350/562, 566; 235/404, 407, 414, 415, 416; 89/41 ME, 41 L

[56] References Cited

U.S. PATENT DOCUMENTS

| | | | |
|---|---|---|---|
| 3,340,614 | 9/1967 | Leatherwood | 33/50 |
| 3,386,330 | 6/1968 | Burris | 88/1 |
| 3,392,450 | 7/1968 | Herter | 33/50 |
| 3,506,330 | 4/1970 | Allen | 350/10 |
| 3,684,376 | 8/1972 | Lessard | 356/21 |
| 3,743,818 | 7/1973 | Marasco et al. | 235/404 |
| 3,948,587 | 4/1976 | Rubbert | 356/21 |
| 3,990,155 | 11/1976 | Akin | 33/247 |
| 4,020,324 | 4/1977 | Buscher et al. | 235/411 |
| 4,020,739 | 5/1977 | Piotrowski et al. | 89/41 ME |
| 4,248,496 | 2/1981 | Akin | 350/10 |
| 4,263,719 | 4/1981 | Murdoch | 33/297 |
| 4,285,137 | 8/1981 | Jennie | 33/298 |
| 4,295,201 | 10/1981 | Wiklund | 356/3 |
| 4,389,791 | 6/1983 | Ackerman | 356/21 |
| 4,404,890 | 9/1983 | McAlpine | 89/41 L |

OTHER PUBLICATIONS

Pushbutton Ballistics by Edgar J. Young, Rifle 81 Magazine May–Jun., 1982.

*Primary Examiner*—Errol A. Krass
*Assistant Examiner*—Heather R. Herndon
*Attorney, Agent, or Firm*—Warren F. B. Lindsley

[57] ABSTRACT

A microcomputer controlled optical device for determining the distance to objects of known or estimable size which is programmed to control a plurality of associated electronic indicator elements the images of which are optically superimposed upon the image of an object the distance to which is to be determined. This device is useable on surveying instruments, riflescopes and the like and is controllable by the operator who selectively activates it by/with known data. Subsequently, the microcomputer interprets the data and selectively activates indicator elements representative of the relationship between the size of the object image and the distance to the object. Images of readouts are visible in the field of view which are activated and controlled by the microcomputer to indicate the computed distance to the object of interest in yards or meters.

10 Claims, 11 Drawing Figures

| OPERATOR ACTION | I/O INPUT PIN STATUS | | RESULTING COMMAND |
|---|---|---|---|
| | LINE 80 | LINE 81 | |
| NO SWITCH MANIPULATION | 0 | 0 | OFF |
| PUSH DOWN (NO TOGGLE) | 1 | 1 | CURSOR APPEAR & "HOLD" & RANGE-FINDING PHASE INITIATE |
| PUSH DOWN TOGGLE LEFT | 0 | 1 | CURSOR DOWN |
| PUSH DOWN TOGGLE RIGHT | 1 | 0 | CURSOR UP |

<u>RANGEFINDING SWITCH LOGIC TABLE</u>

MICROCOMPUTER-CONTROLLED OPTICAL APPARATUS FOR SURVEYING, RANGEFINDING AND TRAJECTORY-COMPENSATING FUNCTIONS

BACKGROUND OF THE INVENTION

In the following specification and claims, the expression frame, span, and bracket, including their derivatives in various forms, will be used interchangeably and are to be understood to refer to one and the same measure of target image extent and are to be understood to include any measurement parameter useful to the various applications of the instant invention.

This invention relates to optical devices for surveying, rangefinding and the like and is particularly adaptable for scopes and their use in aiming firearms and the like.

Since the advent of firearms, ways and means have been sought to accurately aim these devices. Evolving from simple notch-and-bead arrangements, the optical riflescope has proved to be the most effective device for the fulfillment of this task.

Riflescopes have been commercially available for many years and have remained largely unchanged since their introduction. These instruments comprises two basic types. The simplest form of riflescope constitutes a body tube or housing, objective and ocular lenses disposed at opposite ends thereof, and a pair of erector lens cells mounted at opposing ends of an erector lens tube situated in the space between the objective and ocular lenses and serving to erect the simple image formed by the objective lens. It is usual that the erector optics tube is controllably pivotable by adjustment screws for the positional fine adjustment of the target image relative to a pair of aiming crosshairs or reticle disposed at the rear plane of focus of the erector optics. The riflescope is fixedly attached to a firearm to provide an image of the object of the operator's interest.

In a second and more complex form of the riflescope, the erector optics are controllably movable along the optical axis to provide an image of varying magnification. A ring or knob external of the body tube is manipulated by the operator to alter, at will, the size of the image in the riflescope within the limits afforded by the design and structure of the particular scope. The range of a zooming riflescope (as it is commonly called) is typically 3× to 9× which means that at the lowest power setting the image is three times lifesize while at the highest setting it is nine times lifesize.

In addition to lens elements, a reticle or crosshair arrangement is provided to assist aiming. The body housing or tube is provided with mounting bracket means by which the riflescope is affixed to the firearm. Once mounted upon a firearm, the riflescope is "zeroed", an operation which establishes a precise relationship between the bore of the firearm and the operator's line of sight through the riflescope. This adjustment is facilitated by means of a horizontal (windage) adjustment and a vertical (elevation) adjustment. "Zeroing" is done in relation to an impact point at a known distance. For instance, a firearm may be "zeroed" so that the aiming reference, the reticle or crosshairs, is aligned with a point one hundred yards distant and is coincident with the placement or location of the projectile at that range. Once established, the alignment is permanent until such time as the rigors of field use necessitate the re-establishment of alignment.

In riflescopes of basic construction, differences in range of actual targets must be compensated for entirely by the operator who first estimates the target's range and then imposes a degree of holdover deemed to be compensatory of projectile drop at that distance. Few shooters become adept at estimating range and at compensating for bullet drop. In the field, variations in terrain, air quality, and ambient light can cause even the best of shooters to misjudge target range a significant percentage of the time resulting in their often being off the mark when firing. Additionally, shooters who are expert at such judgment are able to attain accuracy with only one or two specific cartridges and rifles with which they have become familiar by practice.

Limited static and dynamic means have evolved for range determination and aiming compensation based on the fact that a target's optical image in the riflescope's field of view diminishes in size hyperbolically in proportion to its distance from the operator.

DESCRIPTION OF THE PRIOR ART

Static devices such as those disclosed in U.S. Pat. Nos. 3,392,450 and 4,263,719 feature a special reticle upon which is engraved a plurality of circles of different diameters, or spaced lines, representing the "standard" withers-to-brisket measurement of a deer at a specific distance or range. Additionally, each circle or pair of lines is vertically displaced below the vertically-centered horizontal crosshair an amount figured to be compensatory of average bullet drop at a specific range. Once the shooter selects a circle or pair of lines which most nearly matches the image size of the target, he aligns its associated horizontal line with the target and fires.

Two major disadvantages are inherent in the static means exemplified by these two devices. First, the compensating aiming marks are limited to a single set obliging the shooter to use only one cartridge the trajectory of which must be exactly matched to the reticle's single set of horizontal aiming marks. The difficulty in this is that to have even one set of static aiming marks accurately relate to a given bullet's trajectory would require the riflescope manufacturer's selection of a single popular cartridge for which the riflescope would be custon designed and would wrongly presuppose that all rifles fire cartridges identically. Cartridges other than the one for which the riflescope is designed could not be used with accuracy since their trajectory characteristics would differ.

The second major disadvantage of the static means taught by U.S. Pat. Nos. 3,392,450 and 4,263,719 is that for any range other that the several increments provided for by the static reticle spacing, the shooter must estimate an aiming point between pairs of marks. This requirement has the further disadvantage of depriving the shooter of a horizontal crosshair aiming reference.

A further disadvantage of the prior art static means is the cluttering of the field of view. The multiplicity of circles or pairs of lines can lead to confusion during critical or stressful aiming situations, as when time for aiming is limited.

These several limitations make accuracy with these static devices uncertain if not often impossible.

The prior art dynamic means of rangefinding utilizing the relationship between range and the apparent size of the target in the optical image provides a more satisfactory and versatile solution and is exemplified by the devices taught in U.S. Pat. Nos. 3,340,614, 3,506,330, 3,684,376, 3,386,330, 4,248,496 and indirectly, 3,990,155. The device of U.S. Pat. No. 3,340,614 teaches a physical means of moving a reference wire in relation to a stationary wire to frame the target which adjustment further communicates with elevation adjustment means to alter the line of sight in general compensation of target range and the related projectile drop. In the several devices of the other patents referred to above, zooming optics are employed in the erector lens system disposed between the objective and the ocular lenses. The power of magnification may be altered, usually by means of an adjustment ring or knob, to vary the apparent size of the target image. Disposed on the ocular side of the zooming optics, and therefore unaffected by changes in zooming magnification, is a pair of spaced parallel horizontal wires or etched lines. The zooming ring or knob is turned until the target image is either reduced or enlarged to fit the spacing of the pair of parallel wires or lines. Since the target image size is a function of target distance, the position of the zooming ring or knob will vary accordingly. Thus, a range distance scale and an index mark may be provided in association with the zooming knob or ring to indicate target range. Once the target image is properly framed, the operator reads the range distance opposite the index mark. In the device of U.S. Pat. No. 3,506,330, changes in the magnification of the target image are directly communicated to mechanical means to automatically alter the elevation adjustment of the line of sight to generally compensate for projectile drop.

In U.S. Pat. Nos. 3,684,376 and 3,386,330, no provision is made to relate the determined range distance to changes in elevation adjustment for proper holdover. The assumption is that the operator has memorized the published bullet drop tables for the cartridge in use and can mentally estimate required holdover.

Of the several prior art devices to find their way into actual manufacture, one of the most satisfactorily conceived and executed is a riflescope manufactured by Bushnell combining two devices which are separate subjects of U.S. Pat. Nos. 3,990,155 and 4,248,496 (both issued to Akins et al and assigned to Baush and Lomb, Inc.). The device of the first of these two patents is an elevation adjusting knob assembly coupled to the erector optics tube of an associated riflescope which changes the vertical positioning of the scope crosshairs relative to the target image. Indicia on the adjustment knob relate to target distance. A clever and novel feature of this device is its interchangeable knob capability. Each of several knobs bears a different scale of indicia relating to a particular cartridge trajectory. One such knob is left unmarked for individual calibration for special applications in the field by the operator. Combined in the same riflescope is the device of the second Akins patent (U.S. Pat. No. 4,248,496) wherein the device is employed in combination with zooming optical elements and parallel horizontal target-framing reticle wires to provide a readout above the scope's field of view of the range to the target, the image of which is framed by the horizontal framing wires. Upon completion of target framing, the operator sets the elevation-compensating knob to the indicated yardage figure to adjust the aiming crosshairs for proper holdover.

The described Bushnell riflescope has distinct advantages over other devices of the prior art. However, as with all other devices of the prior art, it is a requirement of the Bushnell design that the operator relinquish control of the rifle with one hand to operate the rangefinding device. It is a further disadvantage of this version of the combined device that the operator must move the riflescope away from his eye to bring the elevation-compensating knob into an attitude which will allow observation of the indicia and index mark while setting the device to the proper range. After setting the elevation-compensating knob, it is necessary to relocate the target in the riflescope field of view. The time required for the several operative steps in a riflescope of this design will frequently result in missed opportunities since the target of interest will seldom be so accommodating as to remain in one place sufficiently long for their completion.

A disadvantage inherent in all devices of the prior art which provide elevation-compensation for projectile drop at various ranges is that the means by which this is accomplished is permanently established by gears, threaded members, and/or cams which allow no provision whereby the many variables which affect projectile trajectories are accounted for in their operation.

The factors which markedly affect bullet trajectories are well known in the art of firearms and much study of ballistics data has resulted in considerable knowledge relating to the understanding and prediction of projectile flight curves. Over the years many formulas, equations, and methods of calculation (such as the well known Siacci method) have evolved relating to every aspect of projectile performance. Manufacturers of cartridges apply this accumulated knowledge in exhaustive tests to establish parameters for the use of their products. The resulting extensive information is published by them in the form of tables which show projectile drop in inches for range increments of one hundred yards and at various muzzle velocities.

A relatively new tool in the study of ballistics is the computer. Indeed, many manufacturers now generate ballistics tables entirely by computer. When subsequently compared to actual cartridge firings, these computer-generated tables have proved remarkably accurate.

With the increasing availability of computers and programmable calculators, interest in ballistics calculation has become widespread even among interested lay individuals. An example of this interest from recent popular literature and included here by reference is the article *Pushbutton Ballistics,* by Edgar J. Young, in *Rifle 81 Magazine,* May–June, 1982. This article includes a computer program for a programmable pocket calculator which can generate ballistics tables containing everything a shooter needs to known about the trajectories and flight performance of his bullets.

However, it is to be noted that computer means has not been integrated directly into any of the riflescope designs of the prior art.

SUMMARY OF THE INVENTION

In accordance with the invention claimed, a new and improved microcomputer-controlled device for surveying, rangefinding and trajectory-compensating functions is provided.

Accordingly, it is one object of this invention to provide a new and improved microcomputer-controlled device which may be used for rangefinding and is particularly useful in surveying instruments, rangefinding devices and trajectory-compensating aiming devices for fixed-power and variable-power riflescopes.

Another object of this invention is to provide a new and improved microcomputer-controlled rangefinding control for fixed-power and variable-power riflescopes.

Another object is to provide a rangefinding device which can be set to accurately determine the range of any size object.

Another object of this invention is to provide a rangefinding and trajectory-compensating riflescope wherein information is displayed within the field of view of the device thus eliminating the need for the operator to move the device away from his eye during use.

Another object of this invention is to provide a riflescope which requires the manipulation of a single toggling element to accomplish the various rangefinding functions requiring only one thumb of the operator while the associated rifle is securely held on target with both hands of the operator in their usual position.

A further object of this invention is to provide electronic aiming means for fixed-power and variable-power riflescopes.

A further object of this invention is to provide a riflescope with electronic readout means in the visible field of view indicative of target range and trajectory-compensating aiming point.

Further objects and advantages of the invention will become apparent as the following description proceeds and the features of novelty which characterize the invention are pointed out with particularity in the claims annexed to and forming a part of this specification.

BRIEF DESCRIPTION OF THE DRAWINGS

FIG. 1A is a perspective view of the present invention mounted upon a rifle;

DESCRIPTION OF THE PREFERRED EMBODIMENT

Figure 1:
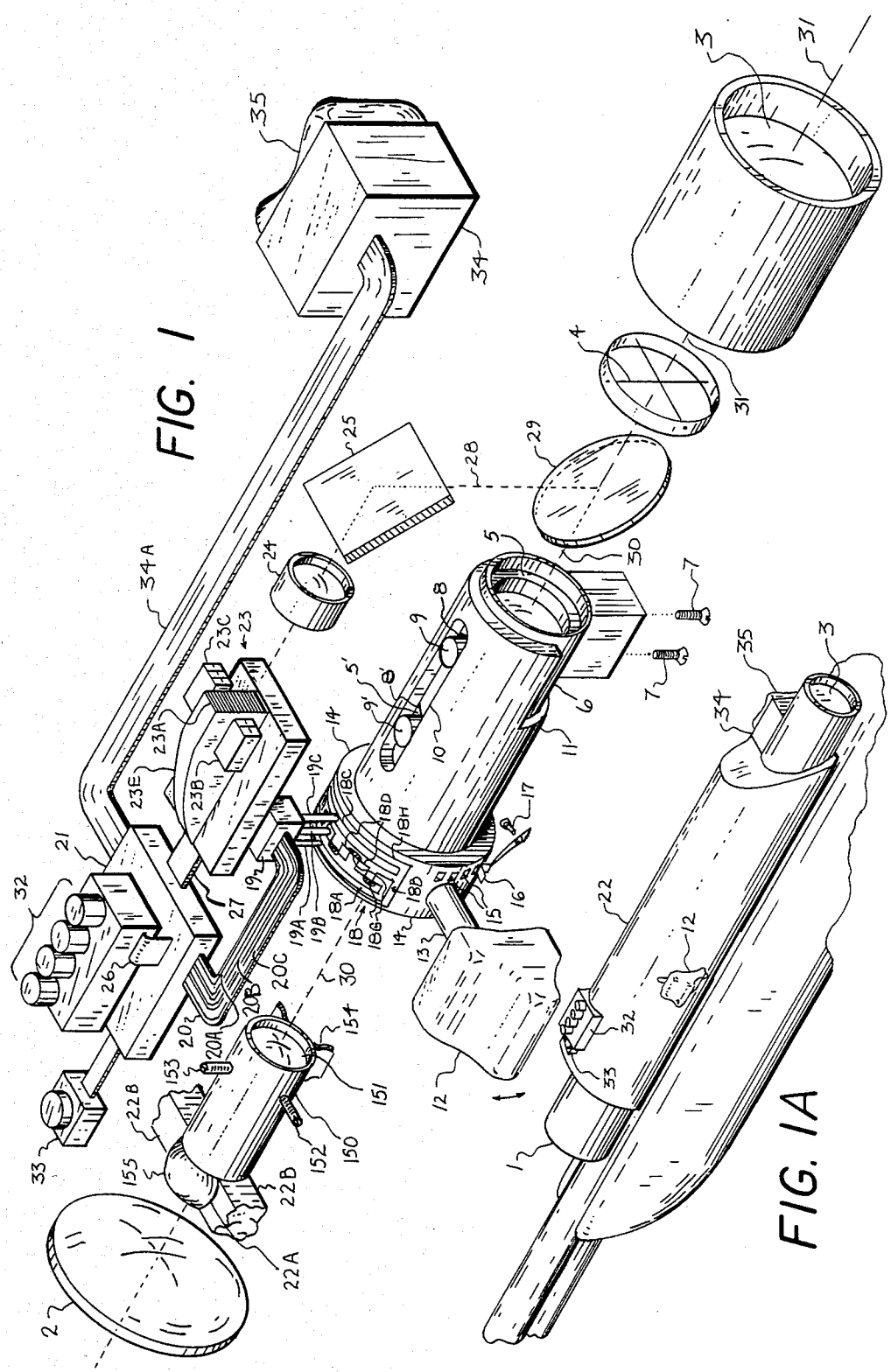
FIG. 1 is an exploded pictorial view of a riflescope embodying the present invention.

Referring more particularly to the drawings by characters of reference, FIG. 1 is an exploded pictorial view showing a preferred embodiment of the present invention. As in conventional riflescopes of this type a body tube or housing 1 (see FIG. 1A as well) supports at opposite ends thereof an objective lens 2 and an ocular lens 3, the latter being axially movable to accommodate the eyesight of various operators to focus upon reticle or crosshairs 4. A pair of erector lens cells 5 and 5' are slidably disposed within erector optics tube 6 which is securely, and immovably, mounted inside body tube or housing 1 by means of screws 7 in alignment with objective lens 2 and ocular lens 3. In the space forward of erector optics tube 16 and rearward of objective lens 2 is supplemental lens tube 150 carrying at its rearward end supplemental lens element 151. Supplemental lens tube 150 is held at its forward, spherically-formed, end 155 by matingly-curved faces 22A of extended portions 22B, integral to housing 22, in alignment with optical axis 30 so as to be pivotally adjustable at its rearward end. The pivotal adjustment of supplemental lens tube 150 is accomplished by elevation adjustment screw 153 and windage adjustment screw 152 each of which is disposed in a respective threaded hole through housing 22. Disposed between supplemental lens tube 150 and the inner surface of housing 22 is leaf spring 154 which biases tube 150 into contact with adjustment screws 152 and 153.

The positions of erector lens cells 5 and 5' along optical axis 30 determine the degree of image magnification. Lens cells 5 and 5' are controllably slidable within erector optics tube 6. Each of two guide pins 9 and 9' attaches, respectively, to erector lens cells 5 and 5' and, thence, passes through slotted angular openings 8 and 8' of erector optics tube 6 and slotted axial opening 10 of rotatable zoom control tube 11. Thus, when zoom control tube 11 is rotated as indicated by arrows in FIG. 1 within body tube 1 by operator-manipulation of external knob 12, affixed to forward portion 14 of the tube 11 by means of rod 13, erector lens cells 5 and 5' are caused to move along the optical axis 30 toward, or away from, one another as determined by the design of the angular slots 8 and 8' of stationary erector tube 6 to cause changes in the power of magnification of the target image.

That which has been described thus far is old in the art.

The rotation of tube 11 is controlled in a plurality of detented steps determined by a series of detent notches 15, in, portion 14 of zooming tube 11 into which the free, end of detent spring 16 is caused to enter by the bias created by attachment at its other end to body tube 1 by means of rivet 17.

Affixed to the upper surface of portion 14 of zooming tube 11 and electrically insulated therefrom is zoom position-sensing strip 18 comprising positive voltage contact strip 18A, segmented voltage-divider strip 18B, and system common ground strip 18C. Segmented voltage-divider strip 18B consists of a series of contact pads 18D interconnected with one another by resistor elements 18G, of equal value, deposited upon a dielectric substrate 18H in a manner well known in the art. One end of the series is connected to conductor strip segment 18A adjacent one side and parallel to the series and to which positive voltage is applied by means of spring-biased contact element 19A while the other end is connected to conductor strip 18C adjacent and parallel to the other side of the series 18D and connected to system common ground 46 (FIG. 3) by spring-biased contact 19C. Contact 19B contacts each contact pad 18D, in turn, as zoom control knob 12 is moved by the operator to cause tube 11 to move through its range of detent positions.

Fixedly mounted above contact strip 18 is contact support block 19 which maintains contacts 19A, 19B, and 19C in contact with elements 18A, 18B, and 18C, respectively, via the bias of contact springs internal of block 19 and not shown. Attached to block 19 is flex-conductor strip 20, comprising conducting elements 20A, 20B, and 20C, which conveys electrical signals between the A/D input channel 1 of microcomputer 21 and zoom position-sensing contact strip segments 18A, 18B, and 18C, respectively, via contacts 19A, 19B, and 19C, respectively, of contact support block 19.

Adjacent and structurally mated with body tube or housing 1 is auxiliary housing 22 (FIG. 1). Body tube 1 and auxiliary housing 22 together form a singular light-tight and dustproof unitary body. Within auxiliary housing 22 are disposed contact block 19, flex-conductor 20, intelligent LED data display unit 23, display focusing optical group 24, front surface mirror 25, microcomputer 21, interconnecting flex-conductor strips 26 and 27, flex-conductor strip 34A, and not shown, the battery compartment, batteries and on/off switch which supply power to the device. Display unit 23, optical group 24, and mirror 25 are mounted in precise alignment within the space defined by the upper extent of body tube 1 and the lower extent of housing 22.

Defined elements of display unit 23 consist of fiber-optically condensed LED bar display 23A, seven-segment numerical data/yardage display 23C, and seven-segment field-programming mode display 23B, all contained within, and integral to, display housing 23E. Display focusing optical group 24 directs the light emitted by the data display unit 23 along optical axis 28. The focal length of focusing optical group 24 is such that the image of the display unit 23 comes into focus upon the plane of reticle or crosshairs 4 after optical axis 28 is introduced into the body tube 1 by front surface mirror 25 which redirects the path of the light at a right angle to beamsplitter 29 disposed within the body tube 1 and situated between reticle or crosshairs 4 and erector optics tube 6. Beamsplitter 29 again redirects the light of optical axis 28 ninety degrees toward the ocular end of the riflescope in parallel alignment with the target optical axis 30. Display optical axis 28 and target optical axis 30 merge as a combined display and target axis 31 in focus on the lane of reticle or crosshairs 4. Precise alignment of the axes provides apparent superimposition of the image of an endmost LED element of bar display 23A with the horizontal crosshair and laterally centered upon the vertical crosshair of reticle or crosshairs 4.

Data input switch bank 32 and display brightness control potentiometer 33 communicate through housing 22 and are connected to microcomputer 21 via multi-conductor connector 26. Display unit 23 interconnects with microcomputer 21 via multi-conductor connector 27. Housing 22 has an extended portion adjacent the ocular portion of body tube 1 which defines rangefinding function switch housing 34 supporting therein rangefinding function switches 87–89 (FIGS. 4 and 6) and single manipulable element 35 so placed as to be convenient to the operator's normal handhold position to allow comfortable access to the manipulable element 35 when the rifle is held in the operator's usual and familiar manner for shooting. Flex-conductor 34A interconnects rangefinding function switches 87–89 with microcomputer 21.

FIG. 1A illustrates a device of the present invention mounted on a firearm.

Figure 2:
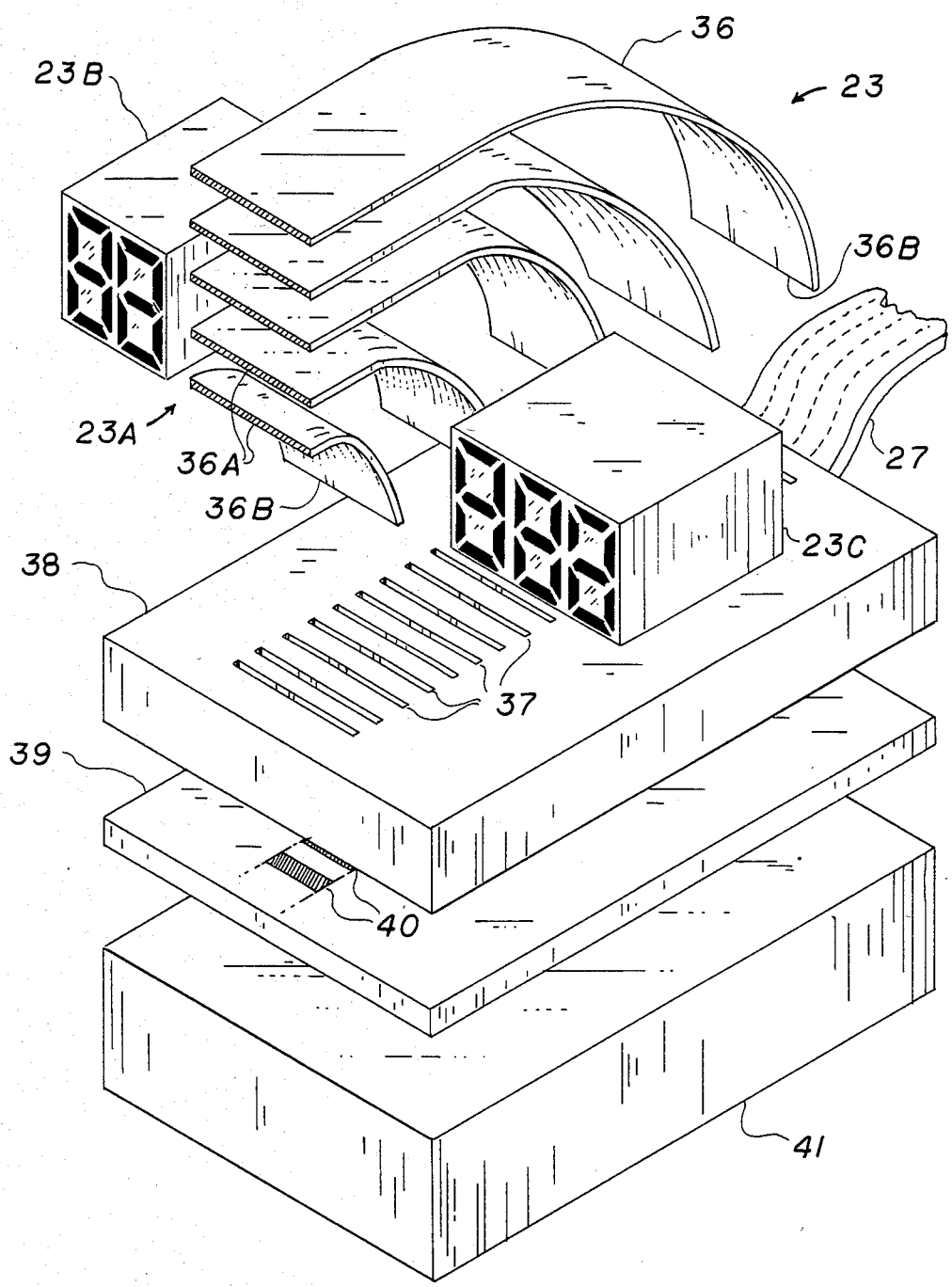
FIG. 2 is an exploded view of the intelligent data display unit incorporated in the invention.

FIG. 2 illustrates the internal structure of intelligent LED data display unit 23. A plurality of fiber optic ribbon portions 36 are intimately bundled at their light-emitting ends 36A (shown in the drawing spaced apart and few in number for clarity) to form condensed bar display portion 23A while their light-receiving ends 36B are centered, respectively, over a plurality of slotted openings 37 of mask 38. The fiber optic ribbon portions 36 and mask 38 may be plotted in opaque resin along with seven-segment display readouts 23B and 23C, as is well known in the art, to form a single durable unit. Substrate 39 supports a plurality of conventional light-emitting diodes 40 each of which is positioned beneath a respective opening 37 of mask 38 when substrate 39 is mated to mask 38. The plurality of LEDs 40, mask openings 37, and fiber optic ribbon portion light-receiving ends 36B, are all so positioned and structured that the light emitted by any particular one of the plurality of LEDs 40 is communicated solely to a particular one of the plurality of mask openings 37 which, in turn, communicates said light solely to a particular one of the plurality of fiber optic ribbon portion light-receiving ends 36B with no spillover to adjacent elements. The light is thence conducted through the length of fiber optic ribbon portions 36 to illuminate the respective ends 36A which collectively make up bar display 23A.

Substrate 39 may be cemented to the underside of mask 38 or, alternatively, may be potted along with fiber optic ribbon portions 36, seven-segment display readouts 23B and 23C, and mask 38. Integral to substrate 39 is display latching and driving logic circuitry 41 which connects via interconnecting multi-conductor connector 27 to the I/O ports of microcomputer 21. Connector 27 also carries the conductors for display unit 23 to microcomputer 21.

It is to be noted that while the use of concentrated fiber optic elements as described above results in greater resolution in the bar display than would be possible with an array of LEDs alone the scope of the present invention does not exclude the use of an LED array alone. Intelligent data display unit 23 effectively generates a rangefinding signal for use by microcomputer 21 in subsequent computations by virtue of which its plurality of bar elements is finally selected in conjunction with the stationary reference to properly span the target image.

As described in the description of FIG. 1, display unit 23 is so mounted that the image of the uppermost fiber optic light-emitting end 36A is precisely aligned with, and superimposed upon, the horizontal crosshair and centered laterally upon the vertical crosshair of reticle or crosshairs 4 which is itself centered in the riflescope's field of view.

Figure 3:
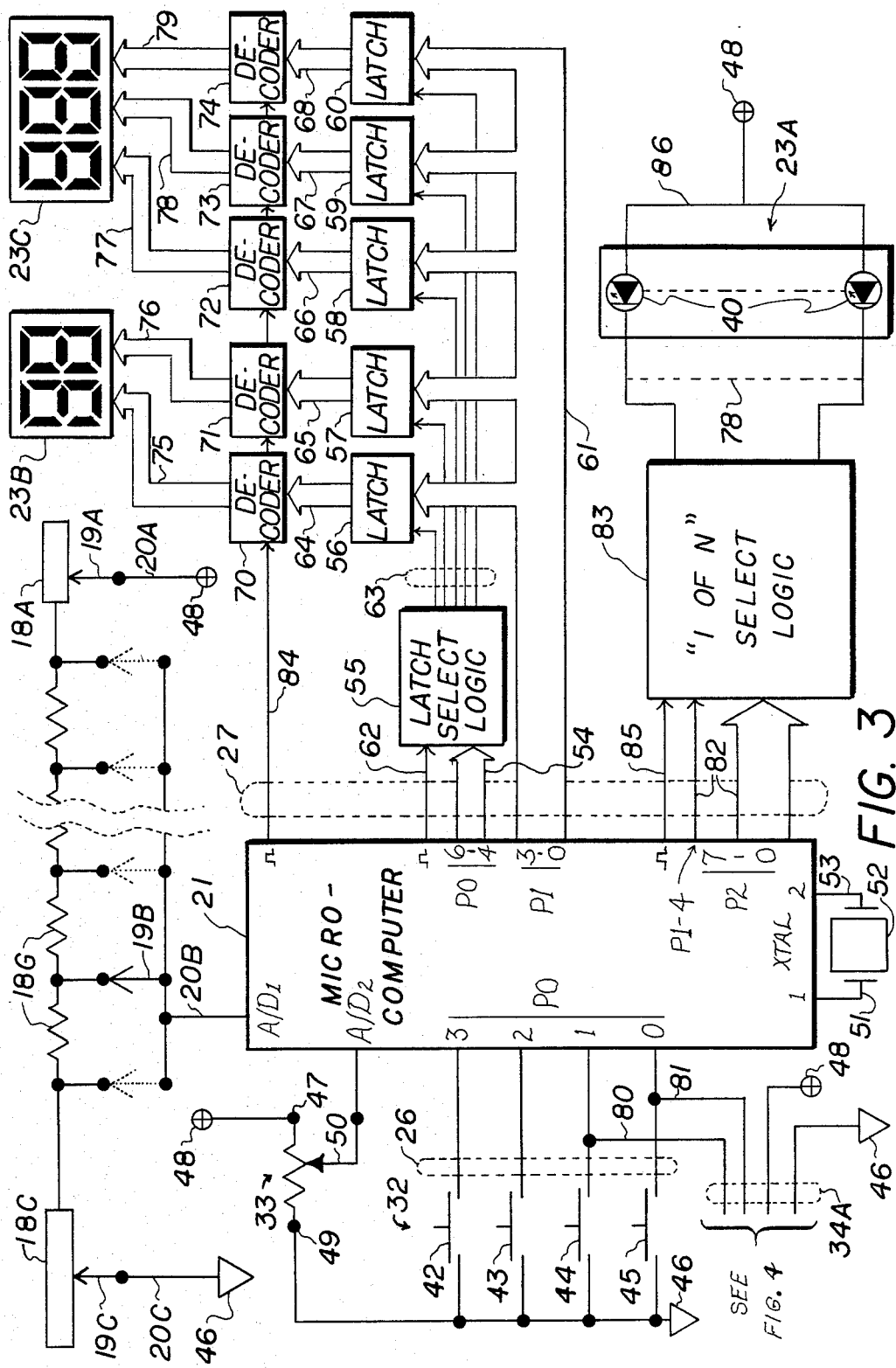
FIG. 3 is a schematic diagram showing the microcomputer and associated elements and their interconnections.

Referring now to FIG. 3, microcomputer 21 is any of the many available generic single-chip 8-bit microcomputers with on-board A/D converter, or is a hybrid circuit designed specifically for the present device. An example of a suitable inexpensive model currently available is Intel Corporation's 8022 8-bit microcomputer chip. The factory specifications and description are incorporated herein by reference.

Data input switches 42–45 are normally-open momentary pushbutton or toggle switches. Microcomputer 21 is permanently pre-programmed to recognize the sequential closing of one or more of these four switches 42–45 as binary-coding for a variety of temporary data storage operations and commands. Thus, a range of different functions for switches 42–45 is provided. Initially, these switches 42–45 will be read by microcomputer 21 in a ballistics data input phase which loads the computer with data particular to the rifle cartridge in use and other variables as will be explained subsequently in the operational description which follows. During the field-programming phase, LED readout 23B functions as visual verification of the programming step or mode and readout 23C serves as visual verification of values of inputed data.

One stationary terminal of each of the data input switches 42-45 is connected to the system's common ground 46 while the other stationary terminal of each switch is connected via multi-conductor connector 26 to I/O port 0, data lines 0-3, respectively, of microcomputer 21.

A stationary terminal 47 of potentiometer 33 is connected to positive power supply voltage 48 while stationary terminal 49 of potentiometer 33 connects to system ground 46. The wiper terminal 50 of potentiometer 33 connects to the second channel of the on-board A/D converter of microcomputer 21. Potentiometer 33 serves to control the brightness level of display 23.

Conductor 51 connects one terminal of quartz crystal 52 to one crystal input pin of microcomputer 21 and conductor 53 connects the other terminal of quartz crystal 52 to the other crystal input pin of microcomputer 21. Quartz crystal 52 provides the clock frequencies required by microcomputer 21 for its various timing functions.

A 3-bit latch-select signal 54 from I/O port 0, data lines 4-6, of microcomputer 21, connects to the latch select logic circuitry 55. This 3-bit latch-select signal 54 selects which of latches 56-60 the data stream 61, from I/O port 1, data lines 0-3, will be written into upon the occurrence of latch signal pulse 62 from microcomputer 21 into latch-select logic circuitry 55. The 4-bit data stream 61 from microcomputer 21, in BCD character form, is latched into appropriate latches by latch-select logic circuitry 55 over appropriate one of conductors 63 interconnecting latch-select logic circuitry 55 to latches 56-60. Thus, data stream 61 is multiplexed into appropriate latches 56-60 in the well known manner.

Upon receiving the latch signal 62, the selected latch of latches 56-60 gates the BCD character, via the data lines 64-68 to the decoder-driver logic circuits 70-74. The BCD character signals are decoded by the decoders which output appropriate seven-segment display signals 75-79 to their respective seven-segment display elements in display units 23B and 23C. Latch-select logic circuit 55, latches 56-60, decoder-drivers 70-74, and all the associated interconnections may be integrally packaged with the LED display unit elements to form intelligent LED data display unit 23 to reduce point-to-point wiring for ruggedness, simplicity, and economy of manufacture.

I/O port 0, data lines 0 and 1, of microcomputer 21, are also connected to rangefinding function switches (to be described later) by conductors 81 and 80, respectively. During the rangefinding phase microcomputer 21 reads the 2-bit data input signal on these two data lines from the rangefinding function switches to control the plurality of bar display LEDs 40 arrayed on substrate 39. Dedicated to this function are I/O port 2, data lines 0-7, of microcomputer 21. These data lines 82 select one of the multiplicity of bar display LEDs 40 to illuminate by way of "1 of n" logic circuitry 83. Data line 7 of port 2 serves to turn on the uppermost bar display LED for stationary cursor reference during the rangefinding phase as will be described later.

All conductors connecting display unit 23, latch-select logic circuitry 55, "1 of n" circuitry 83, latches 56-60, and decoders 70-74 to microcomputer 21 are elements of multi-conductor connector 27.

Also shown schematically in FIG. 3 is the zoom-sense circuitry previously described in detail in the FIG. 1 description.

Blanking signal 84 serves two functions. First, it conserves battery power by blanking the displays a significant portion of the time at an oscillator frequency sufficiently high to be visually unnoticeable, a technique well known in the art. And, secondly, it may be used optionally to totally blank the yardage readout 23C if the operator should so desire for critical aiming operations during which this display may prove distracting.

Blanking signal 85 to bar display logic circuitry 83 serves a similar energy-conserving function as blanking signal 84.

The anodes of the multiplicity of bar display LEDs 40 connect to bus 86 which, in turn, connects to positive supply voltage 48.

Figures 4, 5:
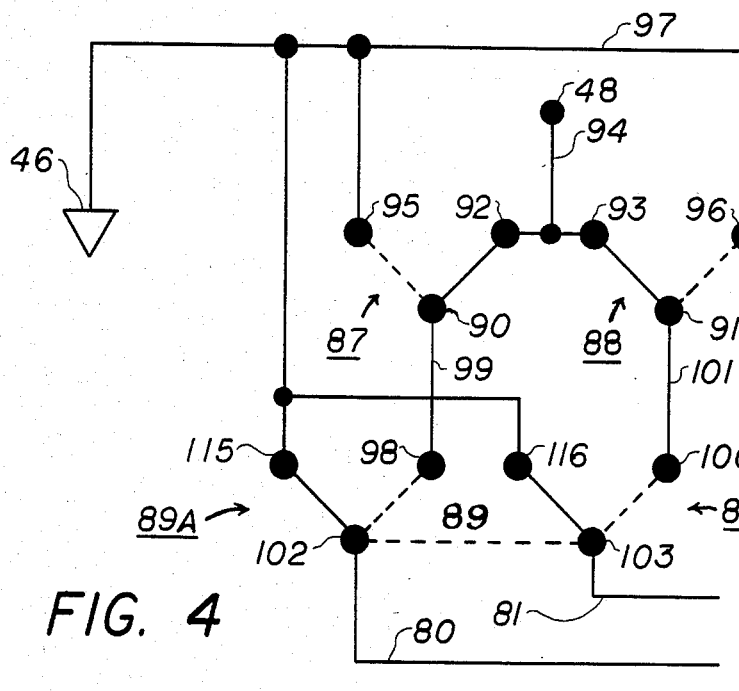
FIG. 4 is a schematic diagram showing the rangefinding function switch circuit of the invention.
FIG. 5 is a table of logic states for the rangefinding function switches.

FIG. 4 is a schematic of rangefinding function switches 87-89, combined into a hybrid design and are contained within rangefinding function switch housing 34 integral with auxilary housing 22 or, alternatively, may be spaced from the riflescope and attached conveniently upon the rifle and interconnected to microcomputer 21 by a length of flexible multi-conductor connector. Switches 87 and 88 are conventional SPDT miniature momentary snap switches while switch 89 is a DPDT pushbutton momentary snap switch comprising two identical SPDT switch sections 89A and 89B. Movable pole contacts 90 and 91 of switches 87 and 88, respectively, are normally biased by the spring internal of each switch into contact with their respective contacts 92 and 93. Contacts 92 and 93 are connected by conductor 94 to positive supply voltage 48. The remaining two normally open contacts 95 and 96 of switches 87 and 88, respectively, are connected to common ground 46 by conductor 97.

The terminal of movable pole contact 90 of switch 87 is connected to the terminal of normally open contact 98 of switch section 89A by conductor 99. Similarly, the terminal of movable pole contact 91 of switch 88 connects to the terminal of normally open contact 100 of switch section 89B by means of conductor 101. The terminal of movable pole contact 102 of switch 89A is connected to microcomputer 21, I/O port 0, data line 1, by means of conductor 80 and the terminal of movable contact 103 of switch 89B connects to data line 0 of the same port by means of conductor 81.

The various conditions of rangefinding function switches 87-89 functioning in unison are in the form of a 2-bit data signal connected by conductors 80 and 81 to I/O port 0, data lines 1 and 0, respectively, of microcomputer 21. The four possible logic states and their meanings to microcomputer 21 are illustrated in the table of FIG. 5. FIG. 5 is a table detailing the logic states of data lines 0 and 1, port 0, of microcomputer 21, during the rangefinding phase of operation. Since the content of FIG. 5 is operational in nature its further description will be deferred to the description of the operation of the invention to be subsequently provided.

Figure 6:
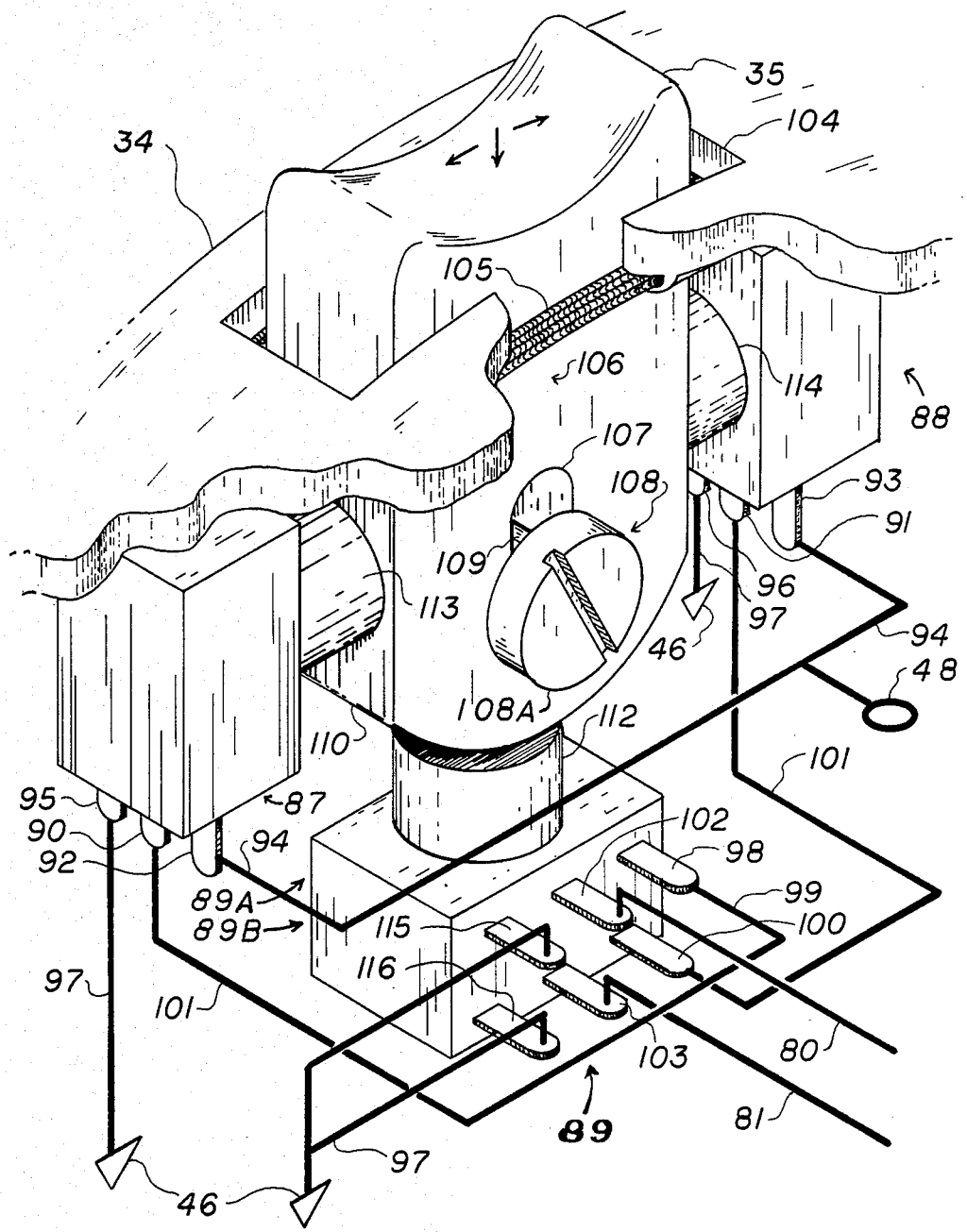
FIG. 6 is a perspective pictorial view of the rangefinding function switch with the housing shown in cutaway fashion.

FIG. 6 illustrates an example of one practical hybrid form rangefinding function switches 87-89 might take whether integral to auxiliary housing 22 or spaced away on the rifle's stock and connected by a length of flexible multi-conductor connector to microcomputer 21. Single manipulable element 35 protrudes through elongated opening 104 of rangefinding function switch housing 34 to be engaged by a thumb or finger of the operator which may depress element 35 inward of the housing 34 and may further toggle element 35, at will, in either of two lateral directions as indicated by arrows above element 35 in FIG. 6. The switch design and placement allows the operator to manipulate element 35 while continuing to hold the rifle steadily with both hands in their usual and familiar positions. Attached around the lower periphery of element 35 and thence to the housing 34 around the inside edge of elongated opening 104 is flexible boot 105 which functions to prevent the entry of dirt and moisture into housing 34.

Integral to element 35 is extended block portion 106 which has elongated opening 107 through which shouldered post screw or rivet 108 passes. Screw or rivet 108 attaches to housing 34 thereby to secure portion 106 within housing 34 in a selectably movable fashion. Elongated opening 107 and post portion 109 of screw or rivet 108 are of such dimensions that block portion 106 moves freely vertically to the limited extent allowed by the length of opening 107. Head portion 108A of screw or rivet 108 is sized to prevent passage over it of block portion 106.

The lower extent of portion 106 defines curved portion 110 the curvature of which is congruent with that of an imaginary circle the center of which is the axial center of post 109 when element 35 is depressed by the operator to bring the upper limit of opening 107 to bear against post 109. Thus, when element 35 is depressed and toggled in one direction or the other as illustrated by arrows in FIG. 6, the surface of curved portion 110 moves in an arc but remains positionally constant vertically.

Snap action pushbutton switch 89 is situated vertically-centered beneath post screw or rivet 108. Pushbutton 112 of switch 89 bears against curved portion 110 and thereby holds the composite unit comprised of element 35 and block portion 106 outward of opening 104 of housing 34 by means of a spring internal of switch 89 when element 35 is not being depressed. In operation, the pressure of the thumb or finger of the operator in depressing element 35 overcomes the bias of the pushbutton snap spring. In the depressed position post 109 bears against the upper extent of opening 107 as previously described. The vertical travel allowed by opening 107 is designed to be equivalent to the distance pushbutton 112 must travel to overcome the internal snap spring of switch 89 thereby to operate switch 89.

Miniature snap action switches 87 and 88 flank portion 106 with their respective pushbuttons 113 and 114 bearing against the sides of portion 106. The opposing bias of these pushbuttons maintain portion 106 in a vertically centered position until such time as the operator toggles element 35 against the bias of one or the other to operate switch 87 or 88 depending upon the direction of toggle. Upon release of element 35 by the operator, pushbuttons 113 and 114 urge element 35 and integral portion 106 back to the vertically centered neutral position.

It is to be noted that rangefinding function switches 87–88 and their inter-related structure may be of any design or configuration suitable to their functions in the operation of the device of this invention as are herein set down.

OPERATION OF THE PREFERRED EMBODIMENT

My means well known in the art of computer programming microcomputer 21 is permanently pre-programmed in manufacture with basic ballistics data and equations pertaining thereto necessary for the determination of target rangefinding, projectile trajectory, and the computation and display of a compensating aiming point. Together with this data are instructions which are operational in nature and include data required for input-sequencing, coding for the identification of switch functions for data input, zooming factors, cursor drive, and so forth. Permanent pre-programming includes data input sequence recognition. Thus, when the operator has entered a particular value for a function via the data input switch bank 32 and has observed in the riflescope that the correct value is displayed on data/yardage display 23C, entry of the value into the computer's memory is accomplished by pressing one or more of switches 42–45 which the computer recognizes during this field-programming phase as a signal to store the displayed data appearing on display 23C and to advance to the next input stage ready to receive data values pertaining thereto. This sequencing of stages occurs each time the operator wishes to enter data pertinent to a particular cartridge, atmospheric conditions, and the like. The sequence may be charted both in instructions accompanying the device and in the form of an adhesive tab applied to the device itself near switch bank 32 or elsewhere.

In practice the operator chooses a cartridge and inputs into microcomputer 21 the particular characteristic values of that choice. This data is commonly available and includes weight of the bullet (grains), muzzle velocity, and the G1 ballistics coefficient of the cartridge. In addition, the sight-in range, in yards or meters, the distance of the riflescope above the bore of the rifle, and atmospheric data are inputed. The sight-in range is determined by the operator when the riflescope is first mounted upon the rifle and is performed empirically, usually at a shooting range. Sighting-in determines the permanent positional relationship between the riflescope and the bore of the rifle. However, the sight-in range may be changed if desired and if this is done, the new sight-in distance is substituted in the field-programming for the previous one. The sight-in range is the distance in yards or meters to the point at which the bullet's trajectory crosses the line of sight on its upward or downward-going portion of travel. This distance is commonly one hundred yards. Thus, if the operator of a conventional riflescope/rifle combination has sighted-in at one hundred yards and then places the crosshairs of the riflescope upon a point one hundred yards distant, the bullet will strike that precise point.

Figure 7:
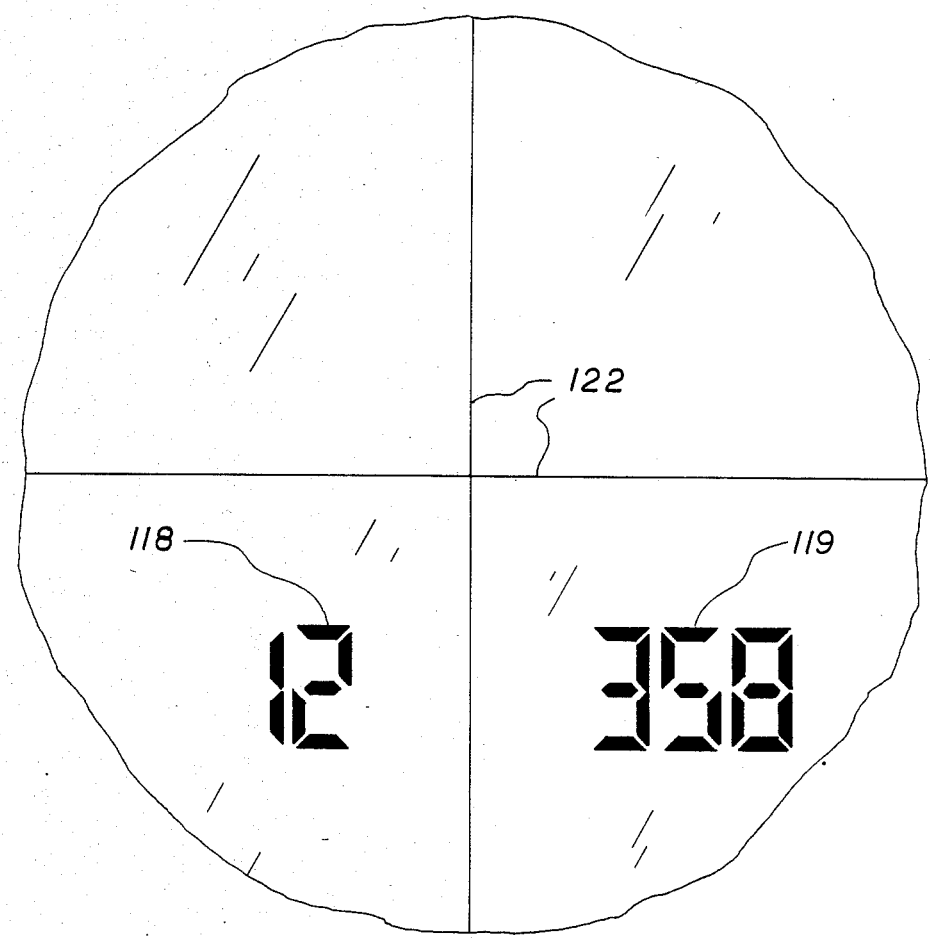
FIG. 7 is a view of the image available to the operator when the device is in the field-programming mode.

FIG. 7 shows the image visible to the operator during the field-programming phase. Field-programming mode or step number is imaged by display 23B as mode image 118 assuring the operator that the computer is prepared to receive data for a particular step while data image 119 provides assurance to the operator that the proper value has been inputed into the computer by displaying that figure.

All pertinent data, with the exception of target range, is programmed into the device by the operator prior to going afield. Among operator-inputed data is the size of the target. For the average deer this would be about 45 centimeters (18 inches) but when hunting other game another figure appropriate to its size is inputed. A chart could be included with the device listing the dimensions of all game animals and relating these to variations from locale to locale. Thus, the rangefinding computations may be very accurately determined.

Also among input data might be cursoring rate and placement of initial cursor appearance relative to the stationary cursor reference.

Given the pre-inputed data microcomputer 21 is able to compute a significant portion of the required calculations ahead of time to await only target range data for completion of the computation sequence. As a result the final computation of a compensating aiming point is performed swiftly once the computer receives the target range value signal.

Provision may be made in the programming of microcomputer 21 for in-the-field input of additional data. For example, data compensatory of variations from the horizontal of the muzzle of the rifle when shooting up or down slopes may be added. It should be noted that single-chip 8-bit microcomputers such as may be employed by the present invention are versatile devices capable of storing considerably more data and of performing far more complex computing tasks than those required by the present device. The addition of an on-board A/D converter, as in the Intel 8022, further expands the functions available from the chip. Thus, functions beyond those described herein are possible and in some instances may be desirable.

Upon completion of data input, microcomputer 21 stands by ready for the second phase of operation, target rangefinding. The operator may at this juncture ascertain whether the display brightness level is properly adjusted to ambient light conditions for the best visibility of the displays and, if necessary, adjust potentiometer 33 to increase or decrease the brightness of the displays as needed.

Figure 8:
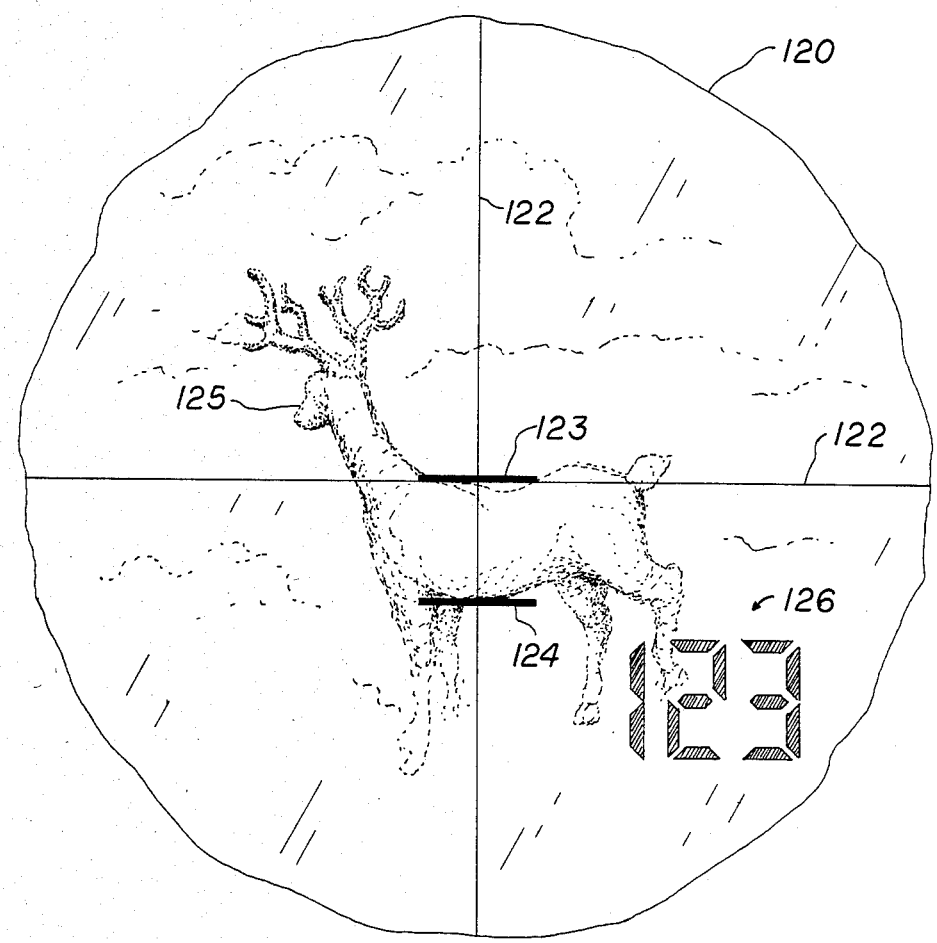
FIG. 8 is a view of the image available to the operator when the device is in the target-framing mode.

FIG. 8 illustrates a typical combined image 120 in the rangefinding mode. Rangefinding signal generating means comprising stationary framing LED image 123 and cursor LED image 124 frame the withers-to-brisket dimension of the target image 125 and target range display image 126 indicates the computed range to the target in yards or meters. This latter display image may be blanked, at the will of the operator, to unclutter the field of view.

Upon bringing the riflescope to bear upon a target of choice the operator first determines whether the degree of magnification is suitable to the target at the prevailing range. If zooming is deemed desirable the operator manipulates zoom control knob 12 to enlarge or reduce the target image as desired. When target image size is optimum the operator depresses single manipulable element 35 to cause switch 89 to change states thus bringing data lines 80 and 81 up from a logic low (0) to a logic high (1). Microcomputer 21 recognizes this new state (both lines high) as the signal to turn on the stationary reference LED, if one is used, and the cursor LED of bar display 23A, to dedicate display 23C to yardage readout, to blank display 23B, and to stand ready to process target range data and cursor commands from rangefinding function switches 87 and 88. The operation of rangefinding function switches 87 and 88 may be better understood by referring to FIG. 5 in relation to the following operational description. Permanent pre-programming may provide that a particular one of the plurality of LEDs 40 will always appear initially as the cursor LED. This may be the LED immediately under the stationary reference LED, if one is used, or, alternatively, may be any other LED of the bar display. However, as previously noted, field-programming may be used to override previous programming to allow the operator free choice of the cursor's initial location. In any case, the same pattern will prevail each time the rangefinding mode is initiated so that the operator will be able to react spontaneously to direct the cursor movement with surety.

With data lines 80 and 81 both in a logic high (1) state the computer is ready for either the "cursor up" or the "cursor down" command. The operator causes the cursor to "move" up or down at will by toggling single manipulable element 35 in one or the other of the two possible toggle directions. The central position of element 35, as was described previously, is the "cursor hold" position in which both data lines are at logic high (1) and with the cursor holding steady. Toggling in one direction will cause the logic state of one line or the other to go low (0). If line 80 goes low (0) microcomputer 21 responds by "moving" the cursor down. Conversely, if line 81 goes low (0) instead, microcomputer 21 responds by "moving" the cursor up. The permanent programming provides that so long as element 35 is held toggled in one direction or the other the LEDs 40 will be sequenced on, either upward or downward in direction, one after another, consecutively, at a rate which is a compromise between speed of operation and sureness of control. If the rate is too slow, speed is unduly sacrificed; if too fast, difficulties of cursor control arise in the form of overshooting. The operator may, during field-programming, alter this rate to suit his or her own idiosyncratic propensities. Toggling back and forth between the two logic states causes the up and down oscillation of the cursor for fine tuning the position of the cursor during final framing of the target.

Ideally, the number and concentration of bar display elements will be great enough that the consecutive sequencing will appear to the operator as the smoothly flowing movement of a single illuminated LED bar image in motion. In practice, the operator brings upper stationary reference LED bar image 123 into tangency with the withers (shoulders) of target 125 by orienting the rifle positionally, and then "moves" cursor image 124 into tangency with the target's brisket (breast), as illustrated in FIG. 8, by selectively manipulating rangefinding function switches 87 and/or 88. It is to be understood that stationary reference LED 123 may be eliminated and the horizontal crosshair, or other indicator used instead.

Once the target framing is satisfactory, the operator releases element 35 which allows switch 89 to return data lines 80 and 81 to logic low (0) states. Thus, the rangefinding signal generating means 123, 124 provide the necessary signal to microcomputer 21 for it to commence the computations required to determine the compensating aiming point.

Figure 9:
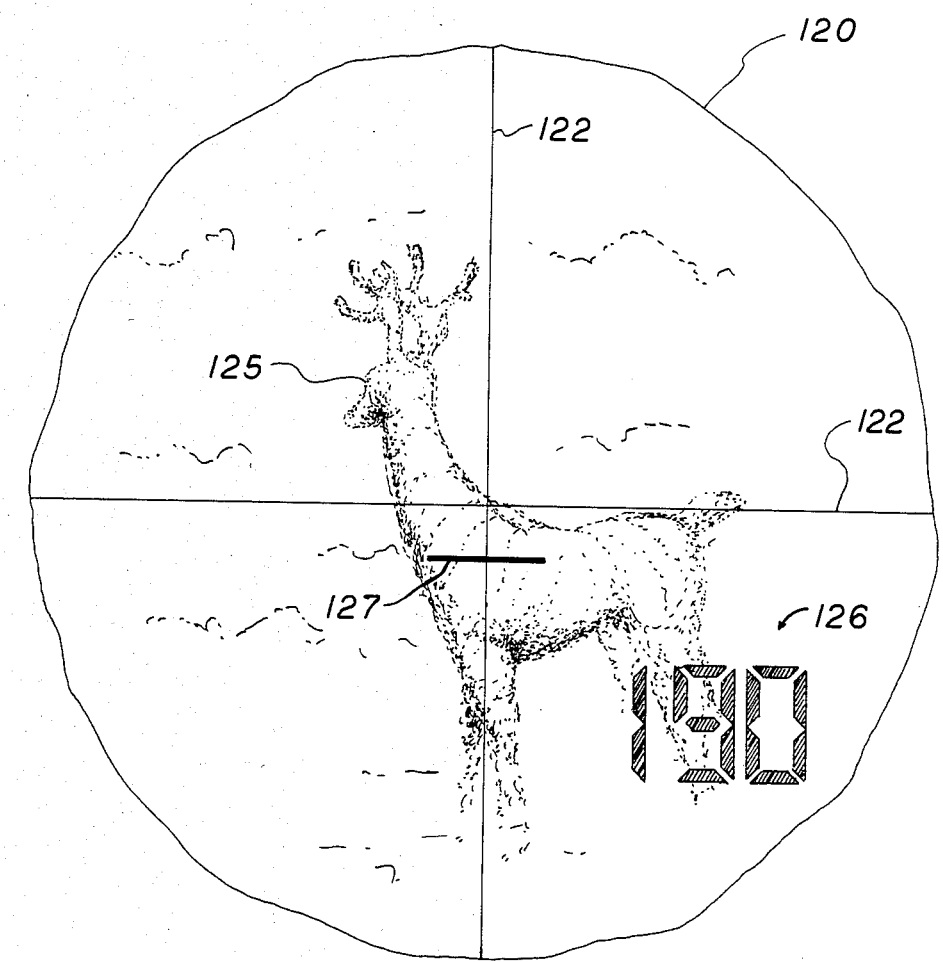
FIG. 9 is a view of the image available to the operator when the device is in the aiming-compensating mode.

A variable factor affecting the computation of both range and compensatory aiming point is the degree of image magnification being imposed by the particular setting of the external zoom control knob 12 (FIG. 1). It will be obvious that the spacing of the stationary reference LED bar image with respect to the cursor LED bar image will necessarily be different for each of the plurality of detented zoom settings and must be accounted for by microcomputer 21. This is accomplished by zoom position-sensing elements 18–20 which supply microcomputer 21 with the required zoom-setting data in the form of a divided-voltage input at one A/D channel input of microcomputer 21. A portion of the permanent programming of the computer concerns the processing of this input relative to the other factors affecting range and compensatory aiming point. The pre-programmed computations take all these variables into account. Upon release of element 35, rangefinding signal generating means 123, 124 provide microcomputer 21 with the final signal required for computing the range to the target. Also upon release of element 35, the stationary reference and cursor LEDs are extinguished while the data/yardage display 23C is illuminated to display the computed target range unless the operator has chosen to blank display 23C during the field-programming phase. When computations are completed, the compensating aiming point is automatically displayed in the form of an illuminated one of the plurality of LEDs 40 of bar display 23A. The illumination of this single LED, as illustrated in FIG. 9, is the final step in the sequence of operation. Upon first being illuminated, the compensatory aiming point LED may be programmed to flash at an attention-getting rate for a moment or two as a signal to the operator that the indicator he or she is observing is, in fact, the aiming marker. This flashing period may be easily included in the permanent programming of microcomputer 21.

FIG. 9, illustrating the combined display of the computed compensating aiming point image 127 and target image 125, demonstrates the manner in which the operator brings the aiming point image 127 to bear upon the target image 125 at the precise point he or she wishes the bullet to impact. It is to be noted that the intersection of the crosshair image 122 is displaced above the impact point. This condition is known as holdover. However, in the present device, the amount of holdover is not a matter of guesswork or approximation as with the devices of the prior art but is, rather, a precisely calculated factor computed with consideration of almost all prevailing variables.

Microcomputer 21 is permanently programmed to "hold" in the compensating aiming point display state as shown in FIG. 9 for a reasonable period to allow sufficient time for aiming and firing of the rifle. Upon expiration of this period the entire system shuts down to a power saving standby state to await the initiation of a new sequence.

However, if, during the last stages of operation, the operator wishes to return to the rangefinding phase (to change targets or the like) the pressing of element 35 terminates the computation in progress and instantaneously returns microcomputer 21 to the rangefinding mode of FIG. 8 for a new rangefinding sequence.

It should be noted that a stationary reference LED is not necessarily required in the present invention. The design and structure of the device could allow the horizontal crosshair, or other physical marker, to function as the stationary reference if such were to prove desirable.

Figure 10:
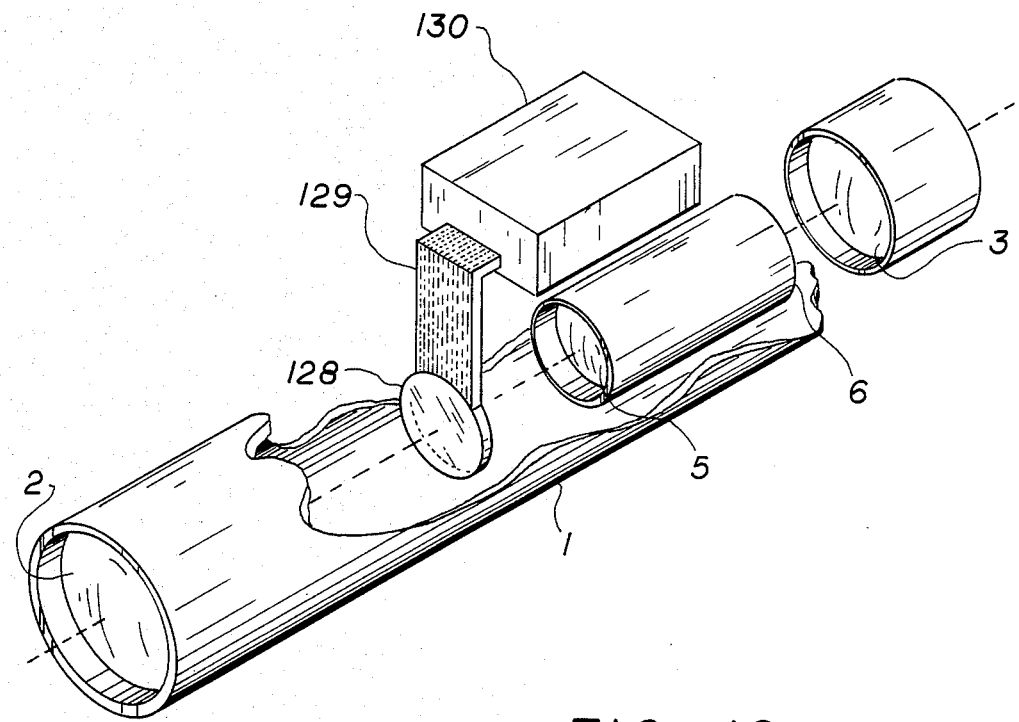
FIG. 10 is a perspective view of an alternate embodiment of the invention.

An alternate form for portions of the present invention are shown in FIG. 10 wherein LCD reticle 128 replaces LED display 23, display optics 24, mirror 25, and beamsplitter 29 of the first embodiment. As is well known in the art of solid state display design, display segments which are not energized in liquid crystal displays, that is, are at a logic low (0), are visually transparent while those segments which are driven at a logic high (1) are opaque. The appearance through the riflescope is essentially the same as shown in FIGS. 7-9 for the LED embodiment with the exception that in the LCD version the cursor and all other displayed data appear as black elements silhouetted against the field of view instead of appearing as transparent luminous red images superimposed upon the field of view.

In the device of FIG. 10 microcomputer complex 130 contains all the logic circuitry, including latches and decoders which, in the LED embodiment are contained in the intelligent display unit 23. Interconnections between the computer complex 130 and the LCD display 128 are made via multiple-conductor flex-connector 129. Other elements shown in FIG. 10 correspond to like number elements of FIG. 1.

Advantages of the LCD embodiment over the LED version are greater structural simplicity and lower power consumption. However, in the LED embodiment the display may be made physically larger with its image optically reduced by the display optics 24. This has tangible design advantages. Also a possible advantage of the LED embodiment is that in many circumstances the transparent luminous red display may be more easily seen in contrast to the target image.

While the above description contains many specifications, these should not be construed as limitations on the scope of the invention but rather as an exemplification of one preferred embodiment thereof. Many other variations are possible; for example, the riflescope need not necessarily be of the zoom variety, the invention applying equally well to the fixed-power type. Also, the aiming indicator may be other than a bar in configuration, for instance, it could be a single dot or a series of dots. And zoom-sensing means may be other that a detented voltage-divider scheme as described; for example, a cam-motivated variable resistor could be utilized as an effective alternative. And the invention may be embodied in devices other than riflescopes to be used solely for range determination as in the art of surveying and the like. Accordingly, the scope of the invention should be determined not by the embodiments presented, but by the appended claims and their legal equivalents.

I claim:

1. An optical apparatus for determining the distance between the apparatus and a target for hand held firearms having fixedly attached thereto a housing supporting ocular and objective lenses at opposite ends thereof and at least one image erecting lens arranged therebetween for forming an erect image of said target at the rear plane of focus of said image erecting lens, said rear plane of focus of said image erecting lens being adjustably coincident with the forward plane of focus of said ocular lens with the optical axes of said lenses being common and lying essentially parallel to the bore of said firearm comprising:

microcomputer means attached to said firearm including memory for receiving and storing permanent and temporary ballistic data, instructions pertinent to range-finding and other ballistic operations, means for computing range and compensation for aiming, and for generating a variety of signals relating to said computations performed relative to and by means of said data and instructions, data input means communicating with said microcomputer means for receiving temporary data and instructions pertinent to rangefinding computations from an operator and storing them in said memory for affecting computations performed by said microcomputer means in a manner compensatory of changes in said data, display means connected to said microcomputer means for selectively displaying indicia indicative of said signals generated by said microcomputer means superimposed upon the field of view of said apparatus viewable by the operator, rangefinding signal generating means controlled by said microcomputer means and associated with said display means comprising a plurality of closely spaced electronic indicator elements adjacent a single stationary visible reference indicator, said plurality of electronic indicator elements being controllably activatable by the operator so as to define a controllably variable space defined by said stationary reference indicator and an activated one of said plurality of electronic indicator elements, the images of said activated electronic indicator element and said single fixed reference indicator lying in a plane common with the forward adjustable plane of focus of said ocular lens of said apparatus so as to provide a focused image of the target superimposed upon focused images of said activated one of the plurality of electronic elements and said single fixed reference indicator all viewable simultaneously by the operator, said variable space being indicative of a relationship between a size of an image of the target and the distance or range of the target from the apparatus and being interpreted by said microcomputer means as a measure of the distance to the target, and said microcomputer means subsequently selectively activating one of said plurality of electronic indicator elements as a result of computations performed relative to said range interpretation and said stored data and instructions for generating a compensating aiming indicator viewable by the operator within the field of view of said apparatus along with the image of the target to facilitate improved accuracy in the aiming of said firearm.

2. The optical apparatus set forth in claim 1 wherein:
said microcomputer means further displays said interpreted distance superimposed upon the field of view of said apparatus viewable by the operator.

3. A rangefinding and aiming apparatus for firearms and the like having a housing supporting ocular and objective lenses at opposite ends thereof and having disposed between said lenses at least one image erecting lens axially movable to alter the degree of magnification of the target image with at least one radially movable lens element disposed between said image erecting lens and said objective lens, the radial movement of which causes said target image to shift radially of the optical axis for purposes of alignment of said image relative to a stationary reference disposed between said image erecting lens element and said ocular lens element whereupon an erect image of said target object is formed and observable comprising:

microcomputer means with memory mounted on said firearm for receiving and storing permanent and temporary data and instructions pertinent to rangefinding and trajectory compensation operations for computing rangefinding and trajectory compensating parameters, and for generating a variety of signals resulting from computations on said data and instructions, data input means connected to said microcomputer means for receiving temporary data and instructions pertinent to said rangefinding and trajectory compensating computations from an operator and storing said temporary data and instructions in said memory for affecting computations performed by said microcomputer in a manner compensatory of changes in said data, display means for selectably displaying indicia indicative of said signals superimposed upon the field of view of said apparatus for observation and verification by an operator, rangefinding signal generating means controlled by said microcomputer means and connected to said display means comprising a plurality of closely spaced electronic indicator elements and at least one visible stationary reference indicator adjacent an endmost one of said electronic indicator elements, said electronic elements being selectively activatable so as to define a variable space between the image of said stationary reference indicator and said activated one of said activatable electronic indicator elements, said space being controllably variable by an operator to bracket the image of a target, said space subsequently being interpreted by said microcomputer means in terms of the distance from said apparatus to said target, one of said indicator elements being subsequently activated by said microcomputer means as a result of ballistic computations made thereby to form a trajectory compensating aiming reference, sensing means for communicating to said microcomputer means variations in a degree of magnification of said target image resulting from changes induced by the operator in the positioning of said image erecting lens element whereby said positional variations produce a signal indicative of said positional changes which, along with particular field programmed ballistic data and rangefinding indicator spacing, affects computations performed by said microcomputer means in a manner to maintain a proportional relationship between the size of the target image and the variable space defined by said activated one of the plurality of electronic indicator elements and said stationary reference indicator in order to assure the generation of an optimum aiming marker signal by said microcomputer means compensatory of all aforesaid variables, and signal input means in communication with said microcomputer means for affecting a value of the output of the microcomputer.

4. The rangefinding and aiming apparatus set forth in claim 3 wherein:
said microcomputer means is permanently programmed with ballistics formulas, equations, and other data pertinent to the computation of rangefinding and trajectory compensating aiming point operations and field programmable with variable values pertinent to particular ballistic characteristics, height of the apparatus above the bore of the firearm, dimensions of the target object and a value representative of prevailing atmospheric pressure.

5. The rangefinding and aiming apparatus set forth in claim 3 wherein:
said data input means comprises one or more switch means for selectably controlling the logic levels of one or more data input lines of said microcomputer means, whereby variable values pertinent to said rangefinding and trajectory compensating aiming point operations and computations may be entered into said microcomputer means, and wherein said data input means further permits entry by an operator into said microcomputer means of operational data pertinent to data display control.

6. The rangefinding and aiming apparatus set forth in claim 3 wherein:

said display means comprises electronic indicator elements disposed in an array outside the optical axis of said apparatus and connected with said microcomputer means for selective activation thereby for displaying data and results of rangefinding and trajectory compensating aiming computations, and a first optical means for introducing the image of the displayed data into the optical path of the apparatus.

7. The rangefinding and aiming apparatus set forth in claim 6 wherein:

said first optical means is positioned outside of the optical path of said apparatus for focusing an image of said electronic display elements upon the rear plane of focus of said apparatus, and further comprising, a second optical means comprising a beamsplitting mirror positioned within the optical path of the apparatus for providing a viewable image of the display means in combination with that of the field of view of said apparatus.

8. The rangefinding and aiming apparatus set forth in claim 3 wherein:

said display means comprises a liquid crystal display element connected to said microcomputer means and positioned within the optical path of said apparatus at the plane of focus of said image of said target object whereby data and indicia are selectively displayed superimposed upon the field of view through said apparatus viewable by an operator.

9. The rangefinding and aiming apparatus set forth in claim 3 wherein:

said sensing means comprises variable signal means in communication with a selectably controllable magnification level control means whereby changes in the position of said magnification level control means result in changes in signal levels being communicated to and utilized by said microcomputer means during subsequent computations for compensation thereof in subsequent rangefinding and trajectory compensating operations.

10. The rangefinding and aiming apparatus set forth in claim 9 wherein:

said display means comprises an illuminated selectively transmissive controllable electronic display means and beamsplitting means disposed within said optical path to reflect an illuminated image of said display for viewing by an operator in conjunction with said target image.

* * * * *